United States Patent [19]

Hutter, III

[11] 4,338,151
[45] Jul. 6, 1982

[54] METHOD OF SECURING AN ADHESIVE ATTACHMENT ASSEMBLY TO A SUBSTRATE

[75] Inventor: Charles G. Hutter, III, Carson City, Nev.

[73] Assignee: Physical Systems, Inc., Carson City, Nev.

[21] Appl. No.: 188,963

[22] Filed: Sep. 19, 1980

Related U.S. Application Data

[63] Continuation-in-part of Ser. No. 74,932, Sep. 13, 1979, Pat. No. 4,302,492.

[51] Int. Cl.³ .................... B32B 31/16; B32B 7/06; B32B 1/00
[52] U.S. Cl. .................................. 156/344; 24/304; 24/DIG. 11; 156/71; 248/205 A; 428/40; 428/41; 428/42; 428/64; 428/65; 428/99; 428/174; 428/343
[58] Field of Search .................... 24/304, DIG. 11; 40/20 R; 156/71, 234, 247, 254, 344; 248/205 A, 206 R, 363, 467; 428/40, 41, 42, 64-66, 99, 157, 158, 174, 343, 63

[56] References Cited

U.S. PATENT DOCUMENTS

| 2,451,194 | 10/1948 | Braun | 248/205 A |
| 2,557,434 | 6/1951 | Hoverder | 248/205 A |
| 2,987,098 | 6/1961 | Daniel | 156/94 X |
| 3,661,683 | 3/1972 | Engel et al. | 156/94 X |
| 3,837,965 | 9/1974 | Mahon et al. | 156/382 |
| 3,885,768 | 3/1975 | Frye | 248/467 |
| 4,025,667 | 3/1977 | Belke | 428/63 |
| 4,167,259 | 9/1979 | Bury | 248/205 A |

Primary Examiner—Edward C. Kimlin
Assistant Examiner—Robert A. Dawson
Attorney, Agent, or Firm—Fulwider, Patton, Rieber, Lee & Utecht

[57] ABSTRACT

A method and apparatus making use of that method for applying pressure to an element to be adhesively or comparably secured to a substrate. An example of such an apparatus is found in an adhesive patch and means for applying the patch to a surface which may have been ruptured.

21 Claims, 25 Drawing Figures

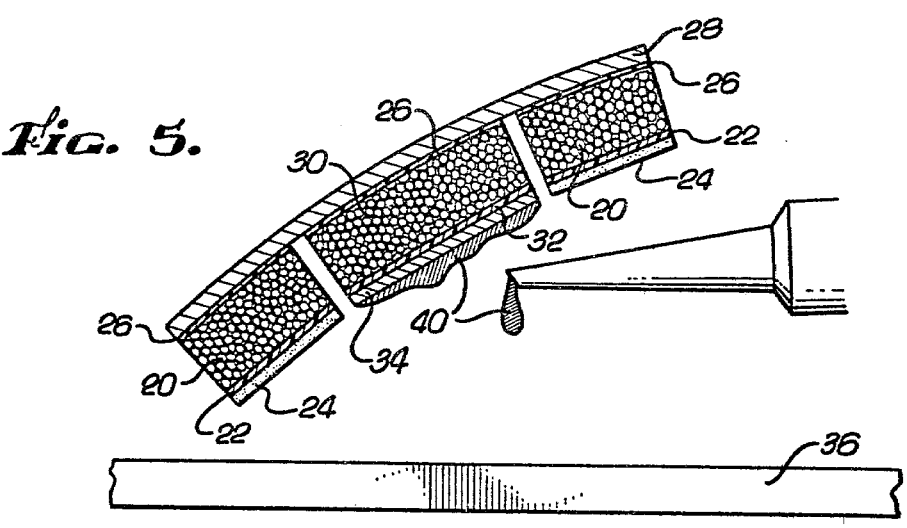
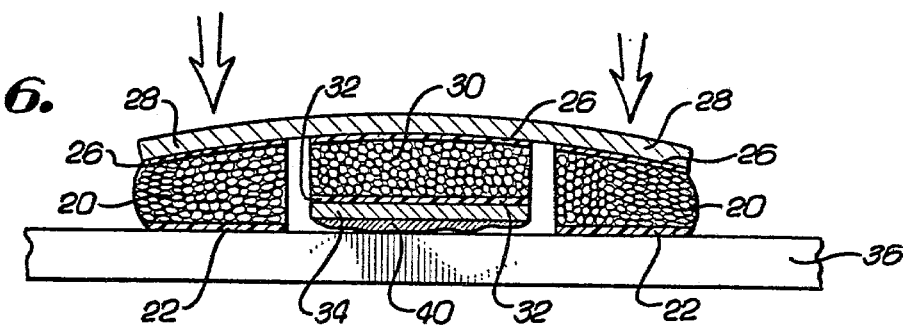
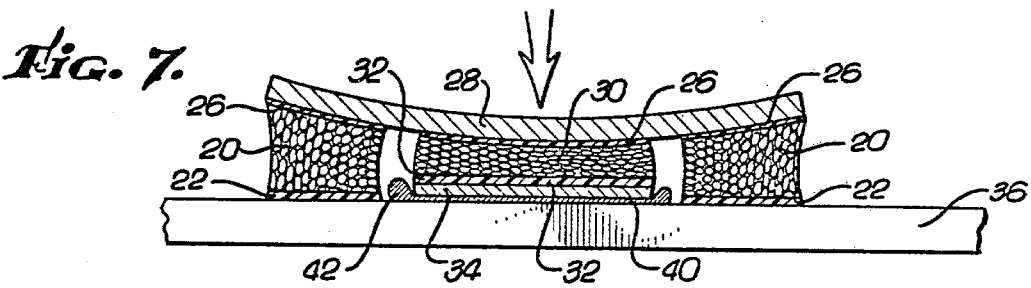
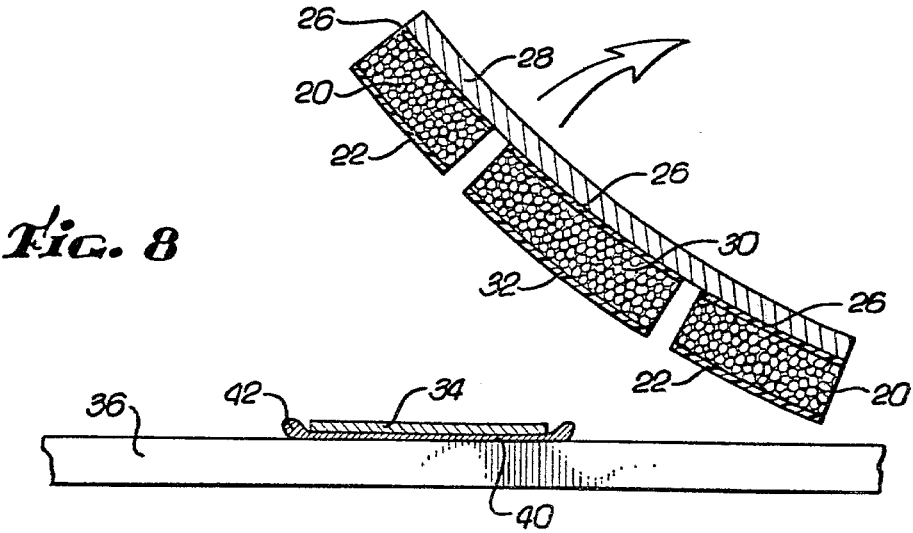

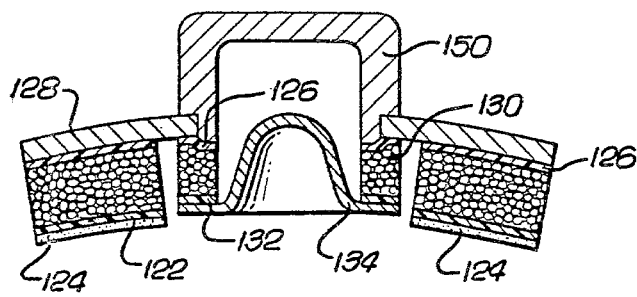
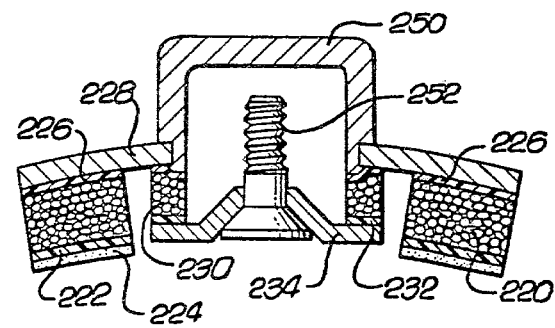
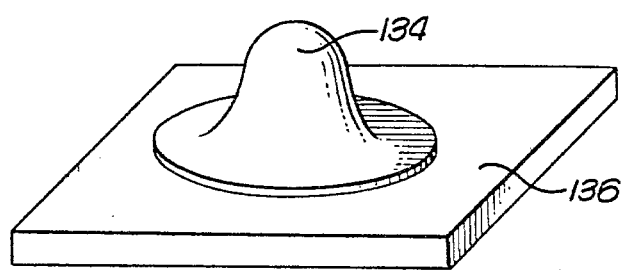
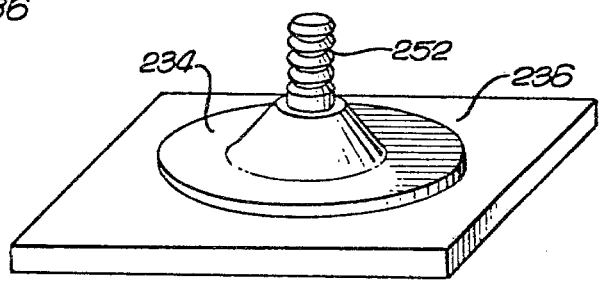
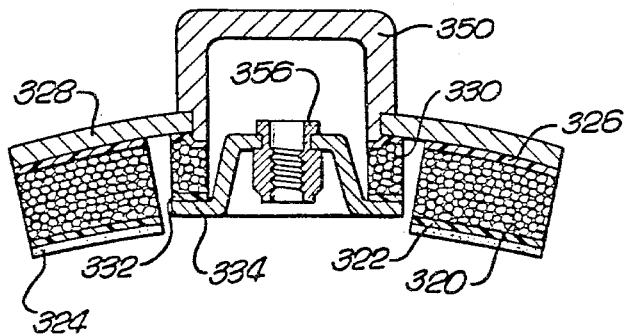
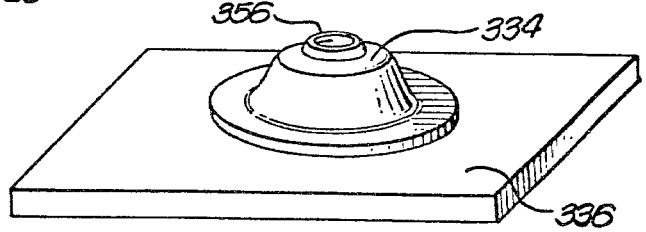

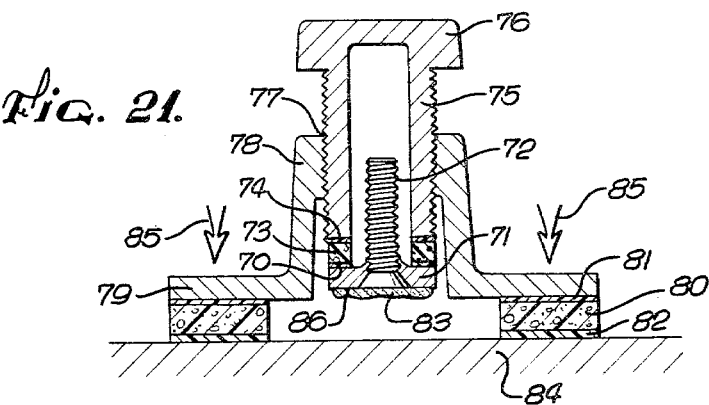
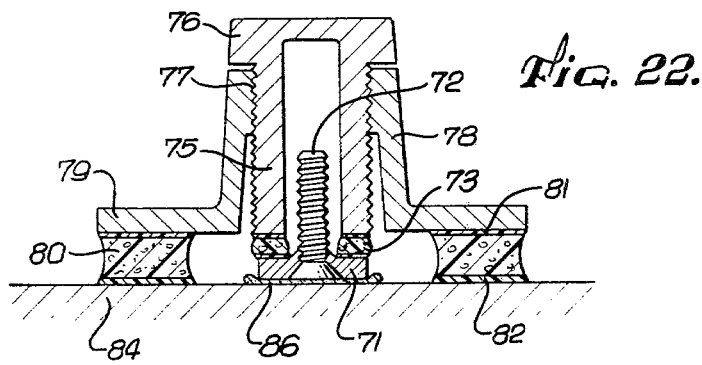
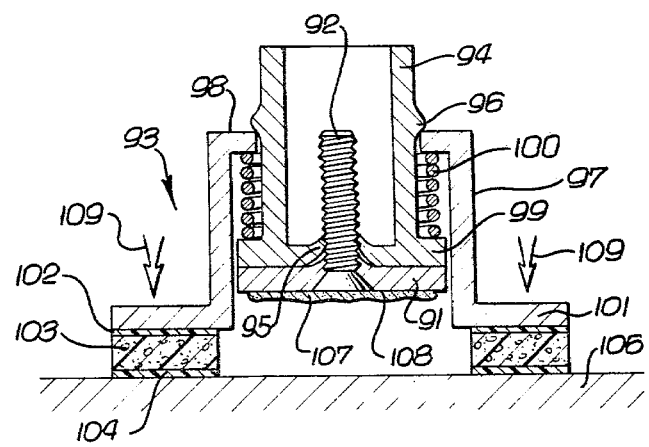
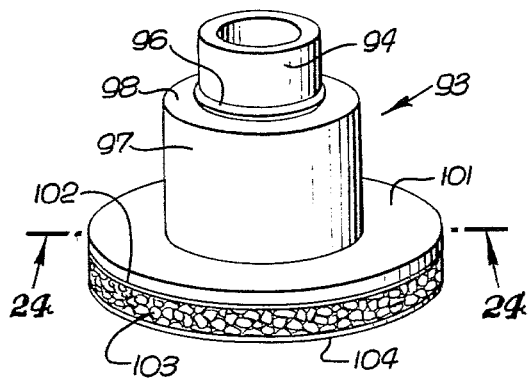
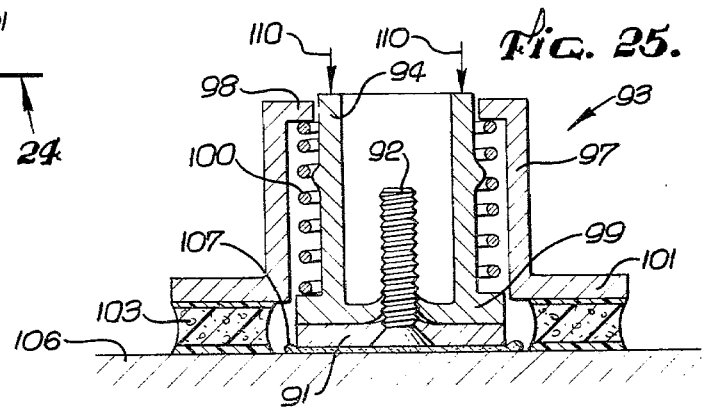

METHOD OF SECURING AN ADHESIVE ATTACHMENT ASSEMBLY TO A SUBSTRATE

BACKGROUND OF THE INVENTION

This is a continuation-in-part of copending U.S. application Ser. No. 074,932, filed Sept. 13, 1979 and now U.S. Pat. No. 4,302,492.

This invention relates to adhesive attachment assemblies and methods for securing an adhesive attachment to a supporting surface or substrate. More specifically, this invention relates to adhesive attachment assemblies and methods for quickly and easily positioning an adhesive attachment upon the substrate wherein the assembly includes means for positively urging the attachment toward the substrate throughout an extended period of time to allow curing of an adhesive or the like.

In many fields, it is important to be able to apply to a substrate an element such as a patch or a holding means such as a stud, machine nut, machine screw, or just a flat plate. Thus, it is often important to be able to repair or cover a hole in the skin of an airplane, to patch or cover a hole in a vessel wherein it is not practical to gain access to the interior of the vessel, or to attach a device to a supporting substrate such as a rear view mirror attached to a glass windshield in an automobile. In many instances, it is possible to make the attachment by means of an adhesive, but in other instances it is necessary or desirable to use another form of bonding such as soldering, brazing, or welding. In all of the applications concerned herein, it is necessary that the attachment element be located with reasonable precision and held in the desired location while the bonding is being affected and in most cases with pressure being applied to the element being attached, forcing it against the supporting surface.

Heretofore, it has usually been considered necessary to provide clamps or other means to hold the attachment element to be bonded in position on the substrate. Such clamps or holding means, sometimes referred to as fixtures, are not convenient to use in many instances, whereby the need has long existed for some method and appropriate corresponding equipment to bond an attachment element to the surface of a supporting substrate.

SUMMARY OF THE INVENTION

The present invention includes an element or attachment to be bonded or attached to a substrate. The attachment is carried by a support member for movement between a first position with the attachment out of substantial bearing engagement with a supporting substrate and a second position with the attachment in bearing engagement with the substrate. Means are provided for temporarily securing the support member to the substrate with the attachment in the first position whereupon the attachment is moved to the second position in bearing engagement with the substrate. In this position, spring means react between the substrate and the attachment to apply a positive force to the attachment to urge the attachment toward the substrate.

In one simple form of the invention, a resilient ring is temporarily adhered to the supporting substrate as by a suitable pressure sensitive adhesive layer. The opposite side of the resilient ring holds the support member such as a dished or warped metal plate whose convex surface is presented away from the resilient ring. The opposite or concave surface of the support member presented toward the supporting substrate carries the attachment which has a free surface presented toward the substrate and upon which is applied a suitable curable adhesive. The convex plate is then pressed over center toward the supporting substrate so that the attachment is pressed into bearing engagement with the supporting substrate and the support member is moved to a concave condition. The resilient ring is thus placed under tension to exert upon the support member and the attachment is positive force directed toward the supporting substrate. After a suitable curing time, the temporary bond between the resilient ring and the supporting substrate is broken, whereupon the resilient ring and the plate are removed from the attachment to leave the attachment firmly secured to the supporting substrate.

Other features and advantages of the present invention will become apparent from the following detailed description, taken in conjunction with accompanying drawings which illustrate, by way of example, the principles of the invention.

BRIEF DESCRIPTION OF THE DRAWINGS

The accompanying drawings illustrate the invention. In such drawings:

FIG. 5 is a vertical cross-sectional view similar to FIG. 4 showing the application of a bonding material to the attachment;

FIG. 6 is a vertical cross-sectional view similar to FIG. 5 showing the positioning and application of the attachment upon the supporting substrate;

FIG. 7 is a vertical cross-sectional view similar to FIG. 5 showing movement of the attachment assembly to a position to apply a force to the attachment;

FIG. 8 is a vertical cross-sectional view similar to FIG. 5 showing the removal of the assembly leaving the attachment in place on the supporting substrate;

FIG. 11 is a vertical cross-sectional view taken on the line 11—11 of FIG. 9;

FIG. 12 is a perspective view of a hat-shaped attachment held to a supporting substrate;

FIG. 13 is a cross-sectional view generally similar to FIG. 11 but showing an alternate attachmeht having a machine screw projecting therefrom;

FIG. 14 is a perspective view similar to FIG. 12 showing the alternate attachment of FIG. 13 held to a supporting substrate;

FIG. 15 is a cross-sectional view similar to FIG. 11 but showing still another alternate attachment carrying a machine nut;

FIG. 16 is a perspective view similar to FIG. 12 showing the alternate attachment of FIG. 15 held to a supporting substrate;

FIG. 21 is a vertical cross-sectional view taken on the line 21—21 of FIG. 20;

FIG. 22 is a vertical cross-sectional view similar to FIG. 21 illustrating the operation of the embodiment of FIG. 20;

FIG. 23 is a top perspective view of a further embodiment of the adhesive attachment assembly;

FIG. 24 is a vertical cross-sectional view taken on the line 24—24 of FIG. 23; and FIG. 25 is a vertical cross-sectional view similar to FIG. 24 illustrating the operation of the embodiment of FIG. 23.

DETAILED DESCRIPTION OF THE PREFERRED EMBODIMENT

Figure 1:
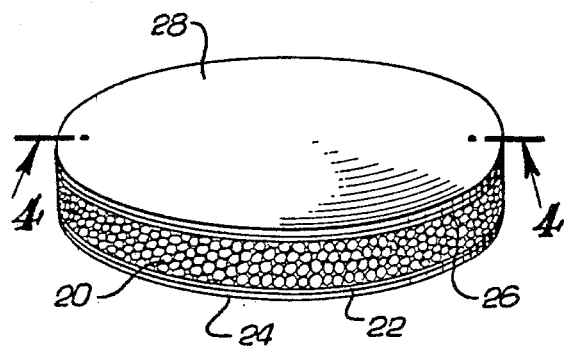
FIG. 1 is a top perspective view of one form of the adhesive attachment assembly.

Turning now to the figures and particularly FIGS. 1 through 4, the present invention comprises broadly a temporary connector means here shown as a resilient ring 20 of foam rubber or the like carrying a pressure-sensitive adhesive layer 22 on its lower surface which in turn is protected by a removable film 24. The opposite or upper surface of the ring 20 is permanently attached by any suitable means such as adhesive 26 to a support member 28.

The support member 28 can take various forms but one of the simplest is that of a convex sheet of resilient metal or spring plate of substantially the same size and shape as the included area of the resilient ring 20 so that in the device shown, the circular resilient ring 20 is attached to the circular support member 28.

Figure 4:
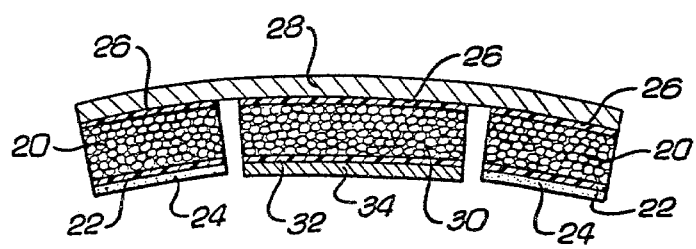
FIG. 4 is a vertical cross-sectional view of the attachment assembly taken on the line 4—4 of FIG. 1.
Figure 2:
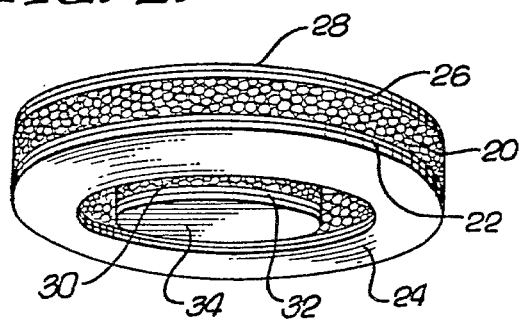
FIG. 2 is a bottom perspective view of the attachment assembly of FIG. 1.
Figure 9:
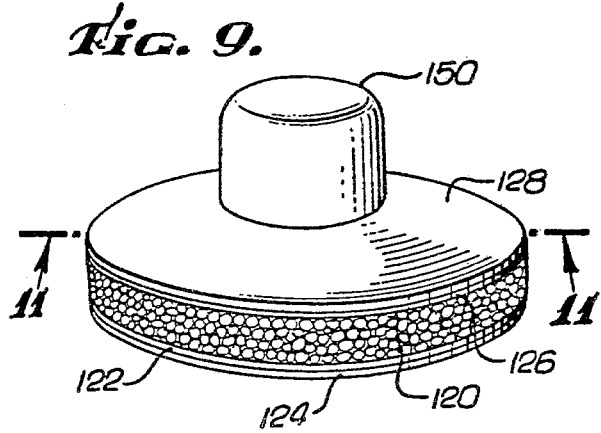
FIG. 9 is a top perspective view of an attachment assembly illustrating an alternate embodiment of the invention.

Centrally located with respect to the ring 20 and spaced radially inwardly therefrom is a resilient pad 30 that is secured by the adhesive 26 to the same surface of the support member 28 as the resilient ring 20. For convenience, this surface and direction will hereinafter be referred to as the lower surface or downward direction as indicated in FIG. 4. However, it is to be clearly understood that this direction is solely for convenience and it is the position of the various elements relative to each other that is important, rather than whether the surfaces and forces are upward or downward.

The lower surface of the central pad 30 is coated with a temporary pressure-sensitive adhesive 32 to which is adhered an attachment or patch 34 that is to be bonded to a supporting substrate 36.

Assuming that the patch 34 is to be applied to the supporting substrate 36, the method of using the device just disclosed is illustrated in FIGS. 5 through 8. After appropriately cleaning the upper surface of the supporting substrate 36 and the lower or free surface of the patch 34, a permanent setting or curable adhesive 40 is applied to the lower surface of the patch 34 as indicated in FIG. 5. The protective film 24 is removed from the adhesive layer 22 on the lower surface of the resilient ring 20 to uncover the pressure-sensitive adhesive layer 22. The patch 34 is then properly located over the appropriate section of the supporting substrate 36 and pressure is then applied to the peripheral edges of the support member 28 as indicated in FIG. 6. This compresses the resilient ring 20 and causes the pressure-sensitive adhesive layer 22 to hold the resilient ring 20 temporarily to the supporting substrate 36. At this time there is preferably no or little contact between the patch 34 or the adhesive 40 thereon with the adjacent supporting substrate 36.

To adhere the patch 34 to the supporting substrate 36, the center portion of the support member 28 is then pressed downwardly toward the supporting substrate 36 as indicated in FIG. 7. As previously mentioned, the support member 28 is formed of a resilient or springable material that has been warped to have a generally convex shape presented away from the supporting substrate 36. When sufficient pressure is applied centrally to the upper surface of the support member 28, as indicated in FIG. 7, the support member 28 snaps over center from a convex to a concave shape. Consequently, the upper surface of the resilient central pad 30 is moved toward surface of the supporting substrate 36 and as a result, the pad 30 is compressed to force the patch 34 against the supporting substrate 36. Excess adhesive 40 is forced outwardly into an annular space between the pad 30 and the resilient ring 20 to form a ring 42 around the patch 34. This flow of adhesive 40 can continue during setting of the adhesive whereby the force applied to the patch 34 tends to urge the patch continuously toward the supporting substrate 36.

Figure 3:
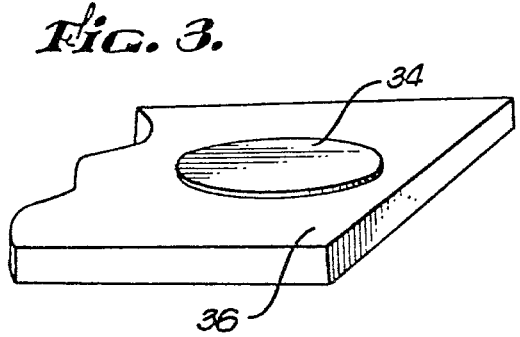
FIG. 3 is a perspective view showing an attachment held to a supporting substrate.
Figure 10:
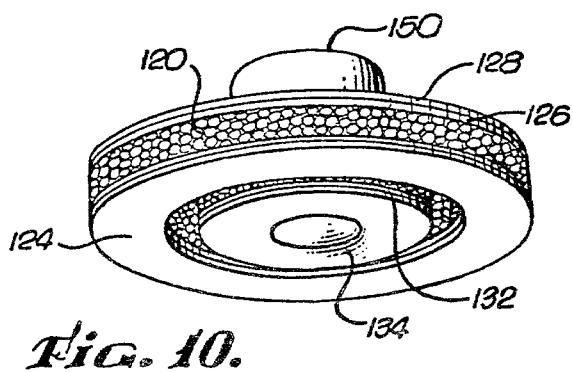
FIG. 10 is a bottom perspective view of the embodiment shown in FIG. 9.

At this point the pressure-sensitive adhesive layer 22 holds the resilient ring 20 to the supporting substrate 36 and the adhesive 26 holds the resilient ring 20 under tension to the support member 28. The pressure-sensitive adhesive layer 22 applied to the lower surface of the resilient ring 20 must have sufficient strength to hold the resilient ring 20 firmly to the supporting substrate 36 while the adhesive 40 is curing. Thus, the resilient ring 20 under tension applies a force to the support member 28 to urge the support member toward the supporting substrate, and thereby also apply a similarly directed force to the patch 34. A study of the forces involved shows that the total force tending to separate the resilient ring 20 and the adhesive layer 22 from the supporting substrate 36 equals the total force pressing the patch 34 against the substrate. After the adhesive 40 has sufficiently cured, additional force is applied to lift the resilient ring 20 from the supporting substrate 36, the pressure-sensitive adhesive layer 22 having less adhesive power than the curable adhesive 40. The pressure-sensitve adhesive 32 releases the patch 34 from the resilient central pad 30, as indicated in FIG. 8, leaving the patch 34 in place as shown in FIG. 3.

It will be recognized that the pressure-sensitive adhesive 32 connecting the patch 34 to the resilient central pad 30 need only have enough holding power to hold the patch 34 and the pad 30 together so that the two are conveniently united. On the other hand, the pressure-sensitive adhesive layer 22 that holds the resilient ring 20 to the supporting surface 36 must have greater holding power since, as indicated in FIG. 7, the pressure applied to the ring 20 by the springable support member 28 places the ring 20 in tension, tending to pull the ring 20 from the supporting substrate 36.

It will also be recognized that it is important that the pressure-sensitive adhesive 32 that holds the patch 34 to the resilient central pad 30 must have less holding power than the curable adhesive 40 holding the patch 34 to the supporting substrate 36. Were this not so, when the resilient ring 20 and springable support member 28 are removed from the supporting substrate 36, the bond between the central pad 30 and the batch 34 would be greater than the bond between the patch 34 and the supporting substrate 36, and consequently the patch would be removed without having performed its intended function.

In FIGS. 9 through 12, there is illustrated another form of the attachment assembly in which the unit or attachment to be applied is what might be termed a hat-shaped attachment rather than the flat patch 34 shown in FIGS. 1–8. The hat-shaped attachment finds a variety of uses as for example where a protuberance such as a nut is located on a flat substrate and a threaded rod extends through that flat substrate and into the nut. If a seal is to be provided over the nut and the threaded rod, the hat-shaped attachment 134, best seen in FIG. 12, is useful.

In this form of device the basic construction is similar to that previously described, with a resilient drag 120 having a pressure-sensitive adhesive layer 122 on its lower surface protected by a protective film 124. The opposite surface of the resilient ring 120 is held by an adhesive layer 126 to a springable support member 128 of the type disclosed in FIGS. 1–8. In the center of the support member 128 is a generally dome-shaped section 150 that extends through the support member and is held thereto by any suitable means. This construction is best seen in FIG. 11.

Centrally located with respect to the resilient ring 120 is a compressible or resilient central annular pad 130 that is held to the support member 128 by the suitable adhesive layer 126. A layer of pressure-sensitive adhesive 132 on the opposite side of the pad 130 holds the hat-shaped attachment 134 with respect to the support member 128.

As with the previously described flat patch 34, the surface of the hat-shaped attachment 134 that is be to bonded to a supporting substrate 136 is coated with an adhesive such as the curable or settable adhesive 40 previously described. The hat-shaped attachment 134 is installed by properly positioning the assembly and then pressing downwardly on the periphery of the support member 128 to attach the resilient ring 120 to the substrate 136 temporarily by means of the pressure-sensitive adhesive layer 122. The dome-shaped section 150 is then pressed downwardly so that the support member 128 is forced over center in the same manner that the support member 28 is forced over center as illustrated in FIG. 7. After the adhesive 40 is properly cured and bonded, the support member 128 and the ring 120 and pad 130 are removed in the manner previously described, leaving the hat-shaped attachment 134 on the supporting substrate 136 as illustrated in FIG. 12.

In FIGS. 13 and 14, an attachment 234 and supporting substrate 236 are shown, comparable to the hat-shaped attachment 134 and the supporting substrate 136 of FIGS. 9–12, the attachment 234 having a screw 252 projecting upwardly from the supporting substrate 236 as best seen in FIG. 14. The construction of this assembly is quite similar to that shown in FIG. 11 with a springable over center type support member 228 carrying a resilient ring 220 cemented to the support member 228 by an adhesive layer 226, with the resilient ring 220 having a pressure-sensitive adhesive layer 222 protected by a removable film 224. A dome-shaped section 250 in the central portion of the support member 228 carries a compressible central annular pad 230 having a pressure-sensitive adhesive 232 that carries the attachment 234 having the upwardly projecting screw 252. The construction is indicated in cross-section in FIG. 13, and the method of application is similar to that of the hat-shaped attachment 134 previously described.

In FIGS. 15 and 16 there is shown another attachment generally similar to those previously described but carrying a threaded nut 356. As illustrated in these figures, a deformable and springable over center type support member 328, similar to the support members 128 and 228, carries a dome-shaped center section 350 and an annular resilient ring 320 attached by means of an adhesive layer 326. A layer of pressure-sensitive adhesive 322 on the ring 320 carries a protective film 324 all as previously described. A compressible central annular pad 330 centered with respect to the resilient ring 320 carries an attachment 334 held to the compressible pad 330 by a pressure-sensitive adhesive layer 332. Centrally located with respect to the attachment 334 is the nut 356 that may be held to the attachment member by any suitable means. The method and means for attachment to a supporting substrate 336 is comparable to that previously described with respect to the foregoing embodiments.

It is to be understood, of course, that the attachment need not take the particular forms herein shown. Thus, if a rectangular patch were to be applied to a supporting substrate, this can very conveniently be done. Likewise, it is not important that the supporting substrate be planar since it frequently happens that a patch must be applied to a curved surface which may be curved in one or two meridians. The resilient ring 30 and the central pad 30 apply sufficient positive pressure to the patch 34 to cause the patch to conform to the surface configuration of the supporting substrate 36.

Additionally, the nature of the adhesive materials is not restricted. The adhesive 40, for example, may be one that gains its strength by evaporation of a solvent; one that gains its strength by chemical reaction, as is the case in some of the epoxy adhesives; or an adhesive that gains its strength and produces a bond by melting as some glue-like materials or even solder.

In each case, it is important that the bond formed between the patch 34 and the supporting substrate 36 be the strongest of the various bonds to be established. The temporary bond formed between the resilient ring 20 and the supporting substrate 36 will be the next strongest bond since in pressing the patch 34 against the supporting substrate 36, the support member 28 is moved to place the resilient ring 20 in tension, tending to pull it away from the supporting substrate. It is important that the resilient ring 20 not be pulled away from the supporting substrate 36 by the action of the springable support member 28, but it is also important that it be possible to remove the resilient ring 20 without a great deal of difficulty after the bond between the patch 34 and supporting substrate has been completed. The bond created by the pressure-sensitive adhesive 32 holding the patch 34 to the compressible central pad 30 should be a relatively weak bond since it is important that the pad 30 be removed from the patch 34 without any undue strain tending to remove the patch from the supporting substrate 36.

It is also to be understood that it is not essential that the springable support member 28 take the form of a convex disk that can be pressed by the thumb to assume an over center concave shape. Depending upon the size of the patch and its nature, it may be necessary to strike the support member, as with a hammer, to move it over center to the concave shape. While other forms for the support member may be used, the over center discshaped metal spring embodiment illustrated is one of the simplest forms available.

Figure 17:
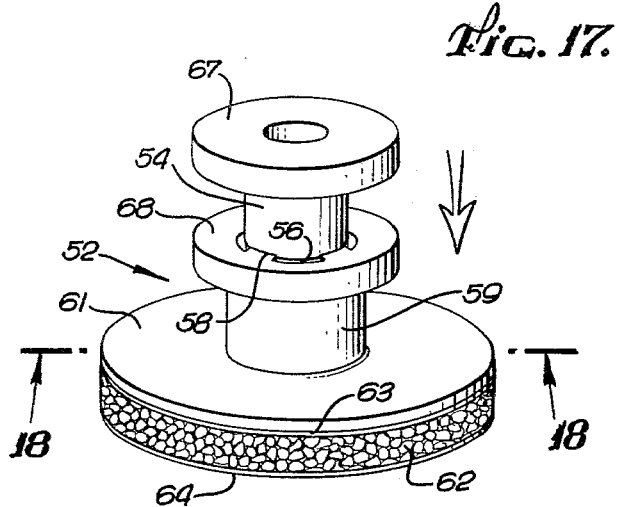
FIG. 17 is a top perspective view of another embodiment of the adhesive attachment assembly.
Figure 18:
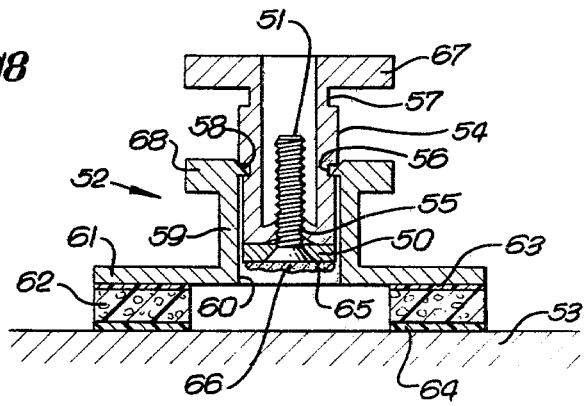
FIG. 18 is a vertical cross-sectional view taken on the line 18—18 of FIG. 17.
Figure 19:
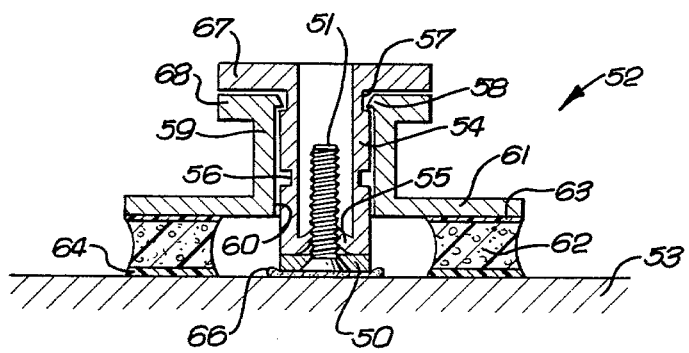
FIG. 19 is a vertical cross-sectional view similar to FIG. 18 illustrating the operation of the embodiment of FIG. 17.

A further embodiment of the invention is illustrated in FIGS. 17-19 and comprises an adhesive assembly with an attachment 50 similar to the attachment 234 of FIG. 14, wherein the attachment 50 supports an outwardly projecting threaded stud 51. The attachment 50 is movably supported upon a support member 52 for securing the attachment 50 to a supporting surface or substrate 53.

More specifically, the support member includes a central hollow cylinder 54 with a radially inwardly projecting lip 55 at one end for threaded engagement with the stud 51. A pair of vertically spaced annular grooves 56 and 57 are formed about the external diameter of the cylinder 54, and these grooves 56 and 57 are positioned for selective reception of locking tabs 58 on a support member housing 59.

The support member housing 59 is also generally cylindrical in shape, and thus includes a central bore 60 for relatively free sliding reception of the cylinder 54. The housing 59 has a plurality of the locking tabs 58 projecting radially inwardly from its upper end as viewed in FIGS. 18 and 19, and these tabs 58 are sized for snap-fit reception either into either the lower groove 56 or the upper groove 57. Thus, the cylinder 54 carrying the attachment 50 is movable between a pair of positions and is lockable in the related position by means of the tabs 58 within one of the grooves 56 and 57. Importantly, the housing 59 is formed from a suitable metal or plastic material to accommodate the required movement of the tabs 58 between the grooves.

The support member housing 59 also includes at its opposite or lower end, as viewed in FIGS. 17-19, a radially outwardly projecting flange 61 to which is secured an annular, resilient ring 62. This resilient ring 62 is conveniently secured to the flange 61 as by a layer 63 of suitable adhesive, and is formed from a compliant material such as a resilient foam or the like generally identical with the resilient ring 20 described above with respect to FIG. 1. This resilient ring 62 further includes on its face opposite the flange 61 a layer 64 of a temporary adhesive material such as a pressure-sensitive adhesive of the type referred to in FIG. 1 as the adhesive layer 22.

In use, the adhesive assembly is temporarily secured to the supporting surface or substrate 53 by pressing upon the flange 61 of the support member housing 59 to secure the pressure-sensitive adhesive layer 64 to the substrate. At this point, the central cylinder 54 of the support member 52 is positioned within the housing 59 with the housing tabs 58 secured within the lower cylinder groove 56. This retains the attachment 50 with its free or downwardly presented face 65 presented toward but spaced from the substrate 53. As in the previous embodiments, a settable or curable permanent bond adhesive 66 has been applied to this face 65 of the attachment.

When a satisfactory temporary bond is achieved between the resilient ring 62 and the substrate 53 by virtue of the layer 64 of pressure-sensitive adhesive, the central cylinder 54 of the support member 52 is pushed within the housing 59 toward the substrate 53. As illustrated in FIG. 19, this translates the cylinder 54 within the housing 59 to lockingly reposition the locking tabs 58 within the upper groove 57 in the cylinder. Conveniently, both the cylinder 54 and the housing 59 include at their upper ends, as viewed in FIGS. 17-19, radially outwardly projecting flanges 67 and 68, respectively, to facilitate manual grapsing of the cylinder 54 for movement thereof toward the substrate without disturbing the temporary bond between the resilient ring 62 and the substrate 53.

When the tabs 58 are locked within the upper groove 57 in the cylinder 54, the attachment 50 is positioned with its free bonding face 65 in pressure-engagement with the substrate 53. This forces the permanent adhesive 66 into intimate pressure-contact with the substrate 53 to fill microscopically sized pores and the like in both the attachment 50 and the substrate 53 to yield a rigid bond therebetween upon curing or setting. Importantly, the position of the upper cylinder groove 57 is chosen so that the resilient ring 62 is placed in tension without releasing its temporary attachment to the substrate 53 whereby the ring 62 functions to urge the entire support member 52 towards the substrate. This correspondingly applies a positive force to the attachment 50 at all times to urge the attachment towards the substrate. To the extent that the permanent adhesive is capable of or desirous of flowing during setting or curing, this positive force applied to the attachment 50 accommodates such flowing by urging the attachment 50 to move closer to the substrate and thereby maximizes the adhesive bond between the attachment and the substrate.

As soon as the permanent adhesive 66 has cured, the temporary bond between the resilient ring 62 and the substrate 53 can be broken as described in the previous embodiments; then, the entire support member 52 can be removed from the stud 51 and the attachment 50 by rotating the support member to release the lip 55 of the cylinder 54 from threaded engagement with the stud 51. This leaves the attachment 50 and the stud 51 secured firmly by the cured adhesive 66 to the substrate 53, generally as shown in the previous embodiment in FIG. 14.

Figure 20:
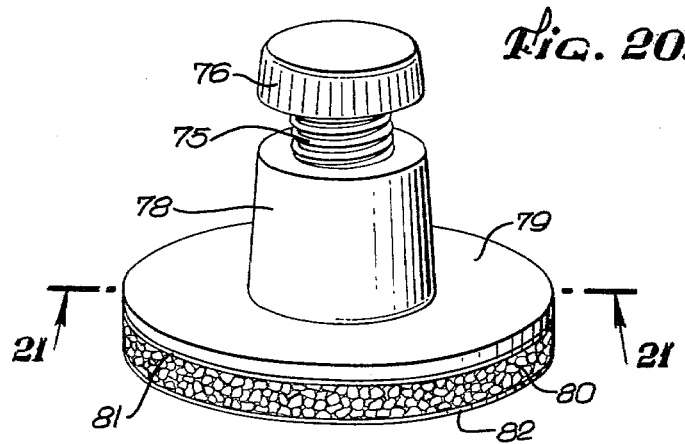
FIG. 20 is a top perspective view of still another embodiment of the adhesive attachment assembly.

Still another embodiment of the invention is illustrated in FIGS. 20-22, wherein an adhesive attachment assembly is shown including an attachment 71 carrying a threaded stud 72 generally identical to the attachment 50 and stud 51 of FIGS. 19-21. This attachment 71 is secured temporarily by an adhesive layer 70 to a relatively small annular resilient ring 73, which in turn is secured by another adhesive layer 74 to one end of a hollow, externally threaded carrier cylinder 75. The stud 72 is received into the hollow interior of the cylinder 75, and the opposite end of the cylinder 75 is closed by an enlarged cap 76 for easy manual grasping thereof, as will be described.

The carrier cylinder 75 is threadably received within a threaded bore 77 of a generally cylindrical support member housing 78, and thus is axially translatable within the housing 78 upon rotation of the cylinder 75 therein. As shown, this housing 78 includes, at its end opposite the cap 76 on the cylinder 75, a radially outwardly projecting flange 79 to which is secured a relatively large annular resilient ring 80 by an adhesive layer 81. This ring 80 generally corresponds with the resilient ring 20 shown and described with respect to FIG. 1 and includes on its face opposite the flange 78 a layer 82 of a temporary adhesive such as a pressure-sensitive adhesive.

In use, a permanent curable adhesive 86 such as an epoxy resin is applied to the free or bonding face 83 of the attachment 71, with the cylinder 75 threadably positioned within the housing 78 to retract the attachment 71 from a substrate 84; then, the relatively large resilient ring 80 is secured temporarily to the substrate 84 by pressing the housing flange 79 toward the substrate, as illustrated by the arrows 85 in FIG. 21. Once a satisfactory temporary bond is achieved between the resilient ring 80 and the substrate 84, the threaded cylinder 75 is rotated to translate the attachment 71 into intimate engagement with the substrate 84. Importantly, the cylinder 75 is moved to a position to place the relatively large resilient ring 80 in tension and the smaller resilient ring 73 in compression, whereby the two rings 80 and 73 together react with the support member housing 78 and the cylinder 75 to apply a positive force to the attachment 71 for urging the attachment toward the substrate at all times. As described with respect to previous embodiments, this application of the positive force to the attachment assures maximum bonding strength between the attachment and the substrate.

Upon curing of the permanent adhesive 86, the temporary bond between the larger resilient ring 80 and the substrate 84 is readily broken, whereupon the support member housing 78, the resilient ring 80, and the cylinder 75 are quickly and easily removed from the attachment 71 by breaking the relatively weak adhesive bond between the smaller resilient ring 73 and the attachment. This leaves the attachment 71 and the stud 72 securely bonded to the substrate 84 with an appearance generally corresponding to that shown in FIG. 14 with respect to a previous embodiment.

A further embodiment of the invention is illustrated in FIGS. 23-25 and comprises an attachment assembly including an attachment 91 carrying a threaded stud 92. In this embodiment, the attachment 91 and the stud 92 are supported by a support member 93 including a central cylinder 94 having a radially inwardly projecting lip 95 at its lower end for threaded reception over the stud 92. From the lip 95, the cylinder 94 extends axially and concentrically about the stud 92 and has an annular ridge 96 projecting outwardly therefrom and positioned generally intermediate its length.

The central cylinder 94 is received within a generally cylindrical support member housing 97. This housing 97 includes, at its end opposite the attachment 91, a radially inwardly projecting rim 98 in generally opposed relation with a corresponding radially outwardly projecting rim 99 at the opposite end of the central cylinder 94. A compression spring 100 is positioned within the housing 97 and about the cylinder 94 to react between these two rims 98 and 99 and thereby function to apply an axial force to the cylinder 94 and the attachment 91.

The support member-housing 97 also includes a radially outwardly projecting flange 101 at its end opposite the rim 98, and this flange is secured by an adhesive layer 102 to an annular resilient ring 103 generally corresponding with the ring 20 of FIG. 1. This ring 103 in turn carries a layer 104 of a pressure-sensitive adhesive for temporary bonding to a substrate 106, as described above with respect to the previous embodiments.

In use, the central cylinder 94 is positioned as illustrated in FIG. 24 with the annular ridge 96 in abutting engagement with the rim 98 on the support member housing 97. The ridge 96 engages the rim 98 on its side opposite the attachment 91 to retain the spring 100 in a compact, compressed condition. In this position, a layer of permanent adhesive 107 is applied to the free or bonding face 108 of the attachment, and the resilient ring 103 is temporarily secured by the pressure-sensitive adhesive to the substrate 106 by pressing the housing flange 101 toward the substrate as shown by arrows 109 in FIG. 24.

Upon achieving a satisfactory bond between the resilient ring 103 and the substrate 106, the central cylinder 94 is pushed toward the substrate 106 as shown by arrows 110 in FIG. 25. This snaps the ridge 96 on the cylinder 94 past the housing rim 98 to allow the compression spring 100 to thrust the attachment 91 into intimate contact with the substrate 106. The spring 100 maintains a positive force upon the attachment to urge the attachment toward the substrate at all times. As described above with respect to previous embodiments, this application of positive force assures maximum bonding strength between the attachment and the substrate. Importantly, the temporary bond between the resilient ring 103 and the housing flange 101 is sufficient to withstand the force applied to the attachment by the spring 100.

When the permanent adhesive 107 is cured, the temporary bond between the resilient ring 103 and the support member housing 97 is readily broken. This allows the entire support member 93 to be rotatably unthreaded from the stud 92 leaving the attachment 91 and the stud securely bonded to the substrate with an appearance generally corresponding to that shown in FIG. 14 with regard to a previous embodiment of the invention.

The adhesive attachment of this invention thus provides a movable support member carrying an attachment and adapted for temporary bonding to a substrate. The support member is movable to position the attachment in intimate contact with the substrate after temporary bonding of the support member to the substrate. Appropriate apparatus is included for application of a positive force to the attachment to maintain the attachment firmly seated against the substrate throughout the curing time for a permanent adhesive, and to urge the attachment for further movement toward the substrate. In this manner, the attachment assembly accommodates any flowing of the permanent adhesive to result in maximum bonding strength between the attachment and the substrate.

A variety of further modifications and improvements to the adhesive attachments described herein are believed to be apparent to one skilled in the art. For example, it should be understood that various studs, nuts, and the like can be utilized with each one of the embodiments shown and described. Accordingly, no limitations upon the scope of the invention are intended, except as set forth in the appended claims.

What is claimed is:

1. The method of applying an attachment to a substrate, comprising the steps of:
mounting the attachment upon a support member movable between two positions into and out of bearing engagement with the substrate;
applying an adhesive to at least one of the mating surfaces of the attachment and the substrate;
temporarily adhering the support member to the substrate;
moving the support member to move the attachment into bearing engagement with the substrate;
applying to the attachment a spring force reacting between the substrate and the side of the attachment opposite the substrate for urging the attachment toward the substrate; and thereafter removing the support member from the substrate and the attachment while leaving the attachment in engagement with the substrate.

2. The method of claim 1 wherein said mounting step comprises releasably securing the attachment to the support member with an adhesive.

3. The method of claim 1 wherein the attachment supports a threaded stud, and wherein said mounting step comprises threadably securing the support member with respect to the attachment.

4. The method of claim 1 wherein said mounting step comprises releasably securing the attachment to a resilient member with an adhesive, and securing the resilient member to the support member.

5. The method of claim 1 wherein said adhesive applying step comprises applying a curable adhesive to at least one of the mating surfaces of the attachment and the substrate.

6. The method of claim 1 wherein said step of temporarily adhering the support member to the substrate comprises adhering the support member to the substrate with a pressure-sensitive adhesive.

7. The method of claim 6 wherein said step of temporarily adhering the support member to the substrate comprises adhering a resilient member to the support member, and temporarily adhering the resilient member to the substrate with a pressure-sensitive adhesive.

8. The method of claim 7 wherein said step of applying a spring force reacting between the substrate and the attachment comprises moving the attachment with respect to the resilient member a sufficient distance to place the resilient member in tension to urge the support member and the attachment toward the substrate.

9. The method of claim 1 wherein said mounting step comprises releasably securing the attachment to a first resilient member with an adhesive and securing the first resilient member to the support member, and wherein said step of temporarily adhering the support member to the substrate comprises adhering a second resilient member to the support member and temporarily adhering the second resilient member to the substrate, said step of applying a spring force reacting between the substrate and the attachment comprising moving the attachment with respect to the second resilient member a sufficient distance to place the second resilient member in tension to urge the support member toward the first resilient member to place the first resilient member in compression and thereby urge the attachment toward the substrate.

10. The method of claim 1 wherein said step of applying a spring force between the substrate and the attachment comprises positioning a compression spring for reaction between the attachment and the support member when the support member is temporarily adhered to the substrate and the attachment is positioned in bearing engagement with the substrate.

11. The method of applying an attachment to a substrate, comprising the steps of:
mounting the attachment upon a support member movable between two positions into and out of bearing engagement with the substrate;
applying a curable adhesive to at least one of the mating surfaces between the attachment and the substrate;
securing a resilient member to the support member;
temporarily adhering the resilient member to the support member with a pressure-sensitive adhesive and with the support member in one position to support the attachment out of substantial bearing engagement with the substrate;
moving the support member to its other position to move the attachment into bearing engagement with the substrate, said moving step including moving the support member a sufficient distance with respect to the resilient member to place the resilient member in tension whereby the resilient member urges the support member and the attachment toward the substrate; and
removing the support member from the substrate and the attachment after substantial curing of the curable adhesive while leaving the attachment in engagement with the substrate.

12. The method of claim 11 wherein said mounting step comprises releasably securing the attachment to a compressible member with an adhesive and securing the compressible member to the support member, said moving step comprising moving the support member a sufficient distance to place the resilient member in tension to urge the support member toward the compressible member to place the compressible member in compression for urging the attachment toward the substrate.

13. The method of claim 11 wherein the support member comprises a first portion carrying the attachment and movably received between two positions with respect to a second portion carrying the resilient member, said moving step comprising moving the first portion to one of the positions with the attachment in bearing engagement with the substrate, and maintaining the first portion in said one position.

14. The method of applying an attachment to a substrate, comprising the steps of:
mounting the attachment upon the concave surface of a spring plate movable over center between a concave and convex position;
applying a curable adhesive to at least one of the mating surfaces between the attachment and the substrate;
securing a resilient member to the concave surface of the spring plate adjacent to the attachment;
temporarily adhering the resilient member to the substrate;
moving the spring plate over center to a convex position to place the resilient member in tension for urging the spring plate and the attachment toward the substrate into bearing engagement with the substrate; and
thereafter removing the resilient member and the spring plate from the substrate to leave the attachment in engagement with the substrate.

15. The method of claim 14 including the step of allowing the adhesive to cure prior to said removal step.

16. The method of claim 14 wherein said mounting step includes releasably securing the attachment to a compressible member and securing the compressible member to the spring plate, said compressible member being placed in compression when the spring plate is moved to the convex position.

17. The method of applying an attachment to a substrate, comprising the steps of:
mounting the attachment upon a first support member;
mounting the first support member upon a second support member for movement between two positions into and out of bearing engagement with the substrate;

applying a curable adhesive to at least one of the mating surfaces between the attachment and the substrate;

securing the second support member temporarily with respect to the substrate with the first support member in one position supporting the attachment out of substantial engagement with the substrate;

moving the first support member to the other position to bring the attachment into bearing engagement with the substrate;

applying to the attachment while in bearing engagement with the substrate a force reacting between the substrate and the side of the attachment opposite the substrate to urge the attachment toward the substrate; and removing the first and second support members from the attachment and the substrate after curing of the adhesive.

18. The method of claim 17 wherein said securing step comprises securing the second support member to a resilient member and temporarily securing the resilient member to the substrate.

19. The method of claim 18 wherein said force applying step comprises moving the first support member a sufficient distance to place the resilient member in tension to urge the second support member toward the substrate, and maintaining the first support member in the other position with the resilient member in tension.

20. The method of claim 17 wherein said force applying step comprises positioning a compression spring between the first and second support members for urging the attachment into bearing engagement with the substrate.

21. The method of claim 17 wherein said step of mounting the attachment to the first support member comprises releasably securing a resilient member to the attachment and securing the resilient member to the first support member, said force applying step comprising moving the first support member a sufficient distance to place the resilient member in compression to urge the first support member toward the substrate and maintaining the first support member in the other position with the resilient member in compression.

* * * * *